US011073964B2

(12) United States Patent
Baker et al.

(10) Patent No.: US 11,073,964 B2
(45) Date of Patent: *Jul. 27, 2021

(54) ELECTRONIC BOOKSHELF SYSTEM

(71) Applicant: NOOK DIGITAL, LLC, New York, NY (US)

(72) Inventors: Philip G. Baker, Solano Beach, CA (US); Dominic G. Fried-Booth, Mountain View, CA (US)

(73) Assignee: NOOK DIGITAL, LLC, New York, NY (US)

( * ) Notice: Subject to any disclaimer, the term of this patent is extended or adjusted under 35 U.S.C. 154(b) by 301 days.

This patent is subject to a terminal disclaimer.

(21) Appl. No.: 15/882,524

(22) Filed: Jan. 29, 2018

(65) Prior Publication Data

US 2018/0150192 A1 May 31, 2018

Related U.S. Application Data

(63) Continuation of application No. 13/961,365, filed on Aug. 7, 2013, now Pat. No. 9,880,703.

(Continued)

(51) Int. Cl.
*G06Q 30/00* (2012.01)
*G06F 3/0482* (2013.01)
(Continued)

(52) U.S. Cl.
CPC ........ *G06F 3/0482* (2013.01); *G06F 15/0291* (2013.01); *G06F 3/0483* (2013.01); *G06F 3/0488* (2013.01)

(58) Field of Classification Search
CPC .. G06F 3/0482; G06F 15/0291; G06F 3/0483; G06F 3/0488
See application file for complete search history.

(56) References Cited

U.S. PATENT DOCUMENTS 9,880,703 B2 1/2018 Baker et al.
2002/0062321 A1* 5/2002 Shibata ............... G06Q 10/107
(Continued)

OTHER PUBLICATIONS https://mashable.com/2010/09/02/lcd-tv-3d-philips/ (Year: 2010).*
(Continued)

*Primary Examiner* — Matthew E Zimmerman
(74) *Attorney, Agent, or Firm* — Finch & Maloney PLLC

(57) ABSTRACT

Techniques are disclosed for purchasing, accessing, consuming, and/or providing electronic content using an electronic bookshelf (eBookshelf) system. The eBookshelf system can be used by accessing a touchscreen-based user interface and/or local hardware controls and/or a remote control. A user's personal library of eBooks and/or any other electronic content can be displayed and/or aurally presented. In addition, the vast content of commercial retailers can also be displayed for browsing and purchase/rental. If the user identifies a content selection on the eBookshelf system that he/she wishes to consume, it can be readily transferred from the system to a personal content consuming device. Multiple eBookshelf systems can be attached to one another to extend the length and/or height of the eBookshelf. Accessing the eBookshelf system by a user ID allows multiple users to enjoy a personally customized version of the system.

20 Claims, 10 Drawing Sheets

Related U.S. Application Data

(60) Provisional application No. 61/680,506, filed on Aug. 7, 2012.

(51) Int. Cl.
*G06F 15/02* (2006.01)
*G06F 3/0488* (2013.01)
*G06F 3/0483* (2013.01)

(56) References Cited

U.S. PATENT DOCUMENTS

| | | |
|---|---|---|
| 2004/0133847 A1 | 7/2004 | Iino et al. |
| 2008/0216009 A1 | 9/2008 | Drallos |
| 2010/0171715 A1 | 7/2010 | Peterson et al. |
| 2012/0036431 A1* | 2/2012 | Ito .................. G06F 40/134 |
| | | 715/273 |
| 2012/0123908 A1 | 5/2012 | Eich et al. |
| 2012/0311438 A1* | 12/2012 | Cranfill ............... G06F 3/0488 |
| | | 715/256 |
| 2013/0041828 A1* | 2/2013 | Gonzalez ............. G06F 21/10 |
| | | 705/51 |
| 2014/0046809 A1 | 2/2014 | Baker et al. |

OTHER PUBLICATIONS https://tidbits.com/2010/04/05/reading-books-on-the-ipad-ibooks-kindle-and-goodreader/ (Year: 2010).*
https://stackoverflow.com/questions/5059134/position-an-overlay-in-the-center-of-the-page-with-jquery (Year: 2011).*
Benko, et al., "Sphere: Multi-Touch Interactions on a Spherical Display," UIST' 08, Oct. 19-22, 2008, Monterey, California, USA. Copyright 2008 ACM 978-1-59593-975, 10 pages, Mar. 8, 2010.
Rathbone, Andy. Windows 7 for Dummies, —for Dummies. Hoboken, N.J.: Wiley, 2009. Electronic Format.
"Apple iPad Vs. Amazon Kindle eReader Face Off," Uploaded on Apr. 7, 2010. https://www.youtube.com/watch?v=Rla-BGEviCo.

* cited by examiner

ELECTRONIC BOOKSHELF SYSTEM

RELATED APPLICATION

This application is a continuation of U.S. application Ser. No. 13/961,365 filed Aug. 7, 2013, which claims the benefit of U.S. Provisional Application No. 61/680,506 filed on Aug. 7, 2012. Each of these applications is herein incorporated by reference in its entirety.

FIELD OF THE DISCLOSURE

This disclosure relates to electronic display devices, and more particularly, to display systems for providing access to consumable content.

BACKGROUND

Electronic display devices such as tablets and eReaders are ideal for displaying consumable content. The content may be, for example, an electronic book (eBook), an online article or blog, images, a movie or video, a map, just to name a few types. Such display devices are also useful for displaying a user interface that allows a user to interact with an application running on the device. The user interface may include, for example, one or more touchscreen controls and/or one or more displayed hardware feature labels that correspond to nearby hardware buttons. The display may be backlit or not, and may be implemented for instance with an LED screen or an electrophoretic display.

DETAILED DESCRIPTION

Figure 1A:
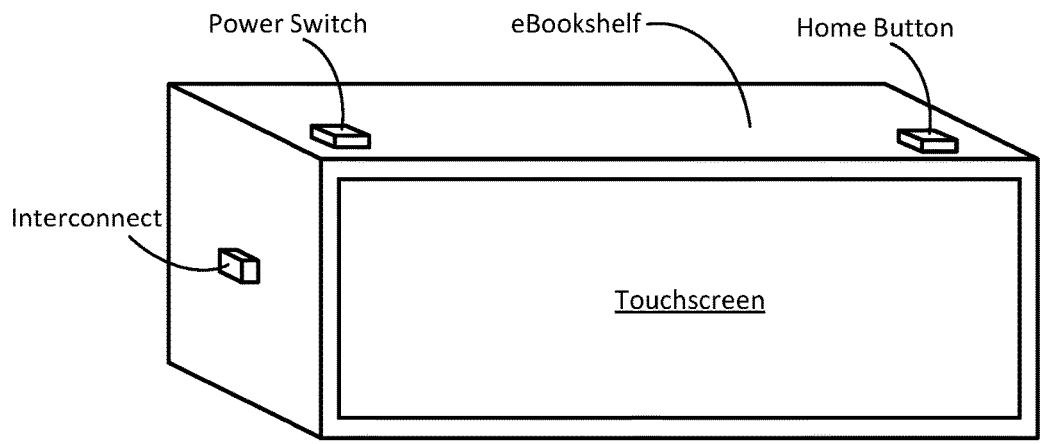
FIGS. 1a-b illustrate left and right perspective views of an electronic bookshelf system configured in accordance with an embodiment of the present disclosure.

Techniques are disclosed for purchasing, accessing, consuming, and/or providing electronic content using an electronic bookshelf (eBookshelf) system. In some embodiments, the eBookshelf system contains a relatively large elongated flat touchscreen display, a connection to a local area network and/or the Internet, content storage and various electronics and componentry and modules including a processor, memory, power supply, and a graphical user interface. Other embodiments may be configured with a spherical touchscreen. The eBookshelf system can be used by accessing the touchscreen-based user interface and/or local hardware controls and/or a remote control. A user's personal library of eBooks and/or any other electronic content can be displayed. In addition, the vast content of commercial retailers can also be displayed for browsing and purchase/rental. If the user identifies a content selection on the eBookshelf system that he/she wishes to consume, it can be readily transferred from the eBookshelf system to a personal device such as a tablet or eReader. Multiple eBookshelf systems can be attached to one another to extend the length of the eBookshelf. Some embodiments include an audio module that allows for aural presentation of selected content. Accessing the eBookshelf system by a user ID allows multiple users to enjoy a personally customized version of the system.

General Overview

As previously explained, electronic display devices such as tablets and eReaders are ideal for displaying user interfaces and consumable content. With the movement to eBook readers, the time to display what we are reading by storing physical books in a bookcase is likely coming to an end. Readers have traditionally utilized physical bookcases, not only to display their own personal library, but to scan previously read books, utilize a reference book, show their friends what's of interest, and to improve the aesthetics of a room. Such opportunities may be more difficult as physical content slips into antiquity.

Thus, and in accordance with an embodiment of the present disclosure, an eBookshelf system is provided that combines features of digital and physical books (and other content), and creates new functionality for home and office libraries, and even for public libraries as they transition into the age of electronic content. Given the currently existing storage capabilities and various mechanisms by which digital content can be accessed, a user can virtually have an infinite supply or in any case millions of books on his/her eBookshelf, all accessible by a touchscreen display. The system can be integrated into a network that includes access to one or more Internet-based content retailers that, in the aggregate, effectively have all published content available for sale. So, the system can be stocked as desired. In some such embodiments, the books can be viewed life size on screen, and with virtual page turning capability integrated into the touchscreen display based user interface.

In one example embodiment, the eBookshelf system is configured with a form factor having the size of a bookshelf with a large elongated color touchscreen or LCD display on its front. In one such case, the system can be sized and otherwise configured to fit on an empty shelf of an actual bookcase (or other suitable shelf). In rest mode, and in accordance with one example embodiment, the display of the eBookshelf system replicates what would normally be seen on an actual bookshelf—dozens of books positioned vertically next to one another. This is the electronic paradigm of a bookshelf. Such an electronic or so-called virtual display of books may provide a similar aesthetic to a room as compared to a well-stocked physical bookcase.

The user can use this device in many ways, for example to search, sample, purchase, and sort, books. The eBookshelf system provides a way to display eBooks that a user owns, as well as those on the user's wish list, for example. In addition, some content providers may provide access to their digital libraries or offerings including full display, content searching, and browsing capability by way of such eBookshelf systems, so as to effectively bring the brick-and-mortar bookstore directly into the consumer's home or office. In such cases, the user could sample or otherwise review books provided by the various content providers, and make desired purchases without having to go to the actual store, but still allowing for an in-store-like experience that is distinct from the well-established experience of merely using a computing device to purchase goods online as commonly done.

As will be appreciated in light of this disclosure, the eBookshelf system may contain its own storage and/or effectively be an access point to (or client of) a cloud-based content supplier. The display can be multi-touch and interactive, allowing the user to, for example, scan this virtual shelf to browse for interesting subject matter, to select and peruse any of the specific books thereon, and to transfer selected content to an eReader or tablet or other personal device. In concept, this virtual shelf of books can be of infinite length, as will be appreciated in light of this disclosure. In some embodiments, a touchscreen-based user interface includes built-in menus and sub-menus that allow searching, sampling and buying, as well as system configuration. For example, the user may touch or tap a spine of a currently displayed book, and an animation then ensues to show the book as it is being pulled out of the shelf and opened for reviewing. Virtual page turning can be accomplished, for example, with finger swipes on the touchscreen. Numerous other such touch-based user interface and control functionality will be apparent in light of this disclosure.

Another example embodiment of the eBookshelf system is in the form of a large spherical globe or so-called booksphere in which the various available books' spines or covers (or other content virtual packaging) are displayed on its surface. In a similar manner as previously described, the user can search, scan and access a virtually unlimited library of books. Spherical touchscreen technology is commercially available, and can be readily integrated with the concepts provided herein. To this end, note that the terms "shelf" or "bookshelf" or "eBookshelf" are not intended to be limited to traditional flat bookshelves; rather such terms would encompass any suitable means for displaying content including spherically presented content.

Thus, an embodiment of the present disclosure provides a new way to display, access and store eBooks and other such digital content, celebrating the importance of the book collection and cover art in the home, and providing easy access to a huge library of books. The user's personal selections and purchases can be displayed, and the user can also define the criteria by which the eBookshelf system further populates the virtual shelf with other available content.

Another embodiment may be used, for example, to provide access to the world's books on one or more eBookshelf systems. Such access could be purchased, for instance, for an annual or monthly fee. Alternatively, browsing access could be provided for a fixed number of hours, for a certain fee (e.g., an hourly rate or a monthly subscription fee for a given number of access hours). In the case of an hourly fee, the accrued fee could be waived or integrated into the purchase cost or otherwise reduced when actual purchases are made. Numerous other business models for selling content will be apparent in light of this disclosure. Such embodiments effectively extend a given content provider's reputation for being a relatively large bookstore company by bringing a "bookstore" into the user's home in a much more visible way than using, for example, an eReader or tablet device on a small display.

The eBookshelf system can be operatively coupled with other eBookshelf systems to provide an extended virtual shelf, if so desired. Wireless connectivity to the eBookshelf system can be implemented, for example, using near field communication (NFC), Bluetooth and/or WiFi to move books from the eBookshelf to a personal reading device or other device on the user's network. Wired connections such as Ethernet may also be used.

System Form Factors

Figure 1B:
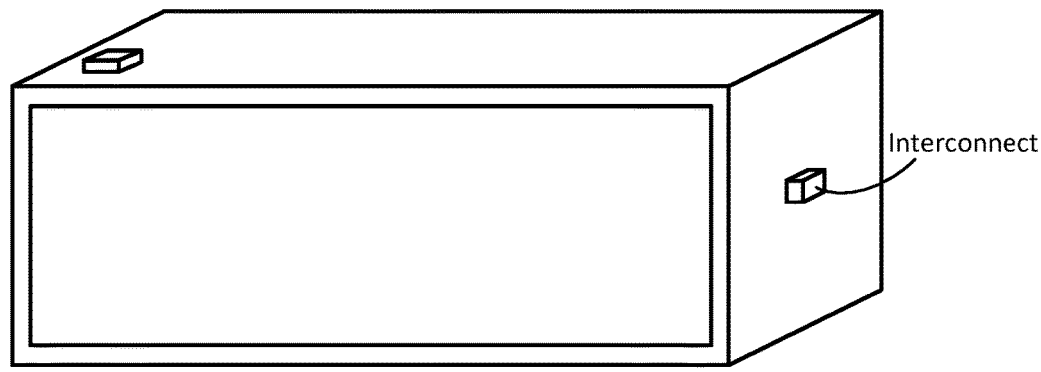

FIGS. 1a-b illustrate left and right perspective views of an eBookshelf system configured in accordance with an embodiment of the present disclosure. As can be seen, the eBookshelf system in this example case has a bookcase-like form factor that includes an elongated rectangular shape which houses the electronics of the system. A touchscreen display makes up the forward-looking face of the system. A power button is provided on the top left for turning the system on and off, and a home button is provided on the top right. The home button can be used, for example, to present the home screen and/or quick launch menu to the user when the system is asleep after a period of non-use, or when the device is in full screen mode and the user wishes to see the quick launch menu. The housing may be made of any suitable material (e.g., aluminum, wood, plastic, or a combination thereof).

The touchscreen can be implemented with any suitable touchscreen technology, and may be a color display, but it need not be. In one specific embodiment, the touchscreen is a large elongated touch LCD color display in the range of 24 to 36 inches long and about 10 to 14 inches tall, although other embodiments can have a relatively large display of any size.

Figure 1C:
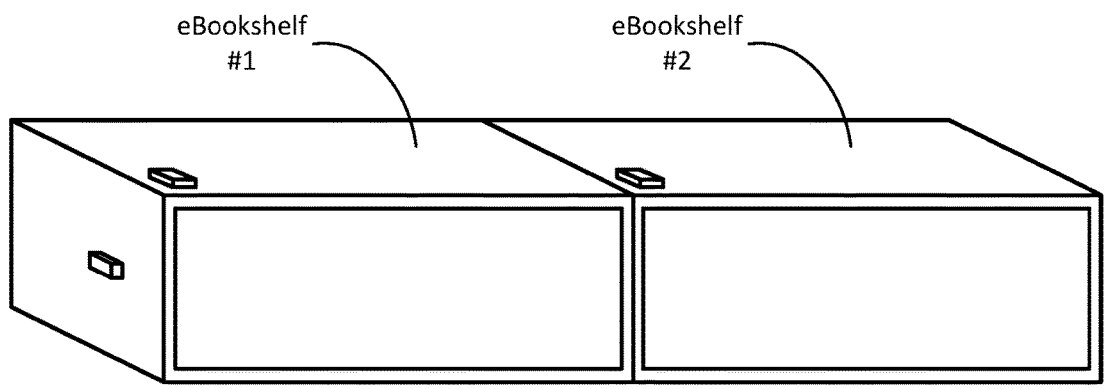
FIG. 1c illustrates a perspective view of an extended electronic bookshelf system configured in accordance with an embodiment of the present disclosure.

The interconnects can be implemented with any suitable data port technology, such as USB, Ethernet, etc. The interconnects effectively allow a number of eBookshelf systems to be daisy-chained together to provide an extended version of the eBookshelf. One such example embodiment is shown in FIG. 1c. Note that the connector on the one side of the eBookshelf system may be male (or female) and the connector on the other side can be the complement. Further note that while the example embodiment in FIG. 1c shows an extension of length (horizontal extension), other embodiments may alternatively (or also) be extended in height (vertical extension). Similar interconnects can be used for any such extensions, for example rigid connectors or ribbon connectors or Ethernet based connectors or other such wired connectors. Other embodiments may implement a wireless interconnect that uses a linking protocol to wirelessly link neighboring eBookshelf systems. In one such example embodiment, a display linking routine that includes a discovery protocol can be used to detect neighboring eBookshelf systems and to query the user if a connection to a neighboring eBookshelf system is desired, and if so, causes the linked display mode to engage accordingly. Once linked, the display is virtually extended as configured.

Figure 1D:
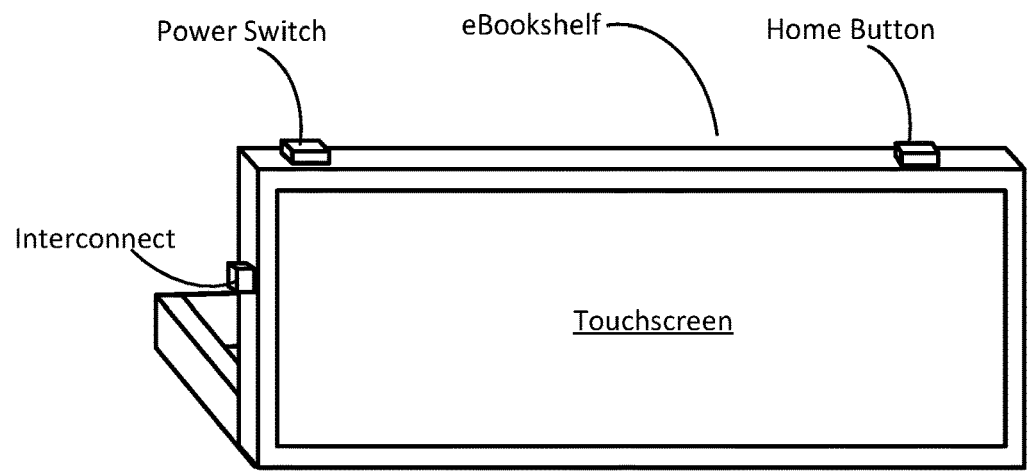
FIGS. 1d-e illustrate left and right perspective views of an eBookshelf system configured in accordance with another embodiment of the present disclosure.
Figure 1E:
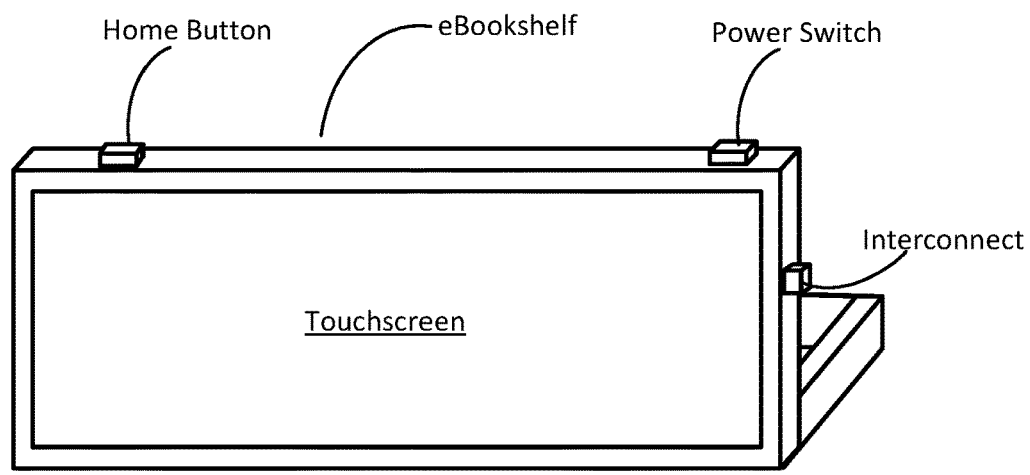

FIGS. 1d-e illustrate left and right perspective views of an eBookshelf system configured in accordance with another embodiment of the present disclosure. As can be seen, the form factor of this example configuration is different in that rather than a box, the housing is L-shaped. Numerous other configurations will be apparent in light of this disclosure. The function and electronics of the eBookshelf system can be implemented in a similar fashion to the embodiment shown in FIGS. 1a-b, for instance, but housed in the relatively shallow display screen encasement.

Figure 1F:
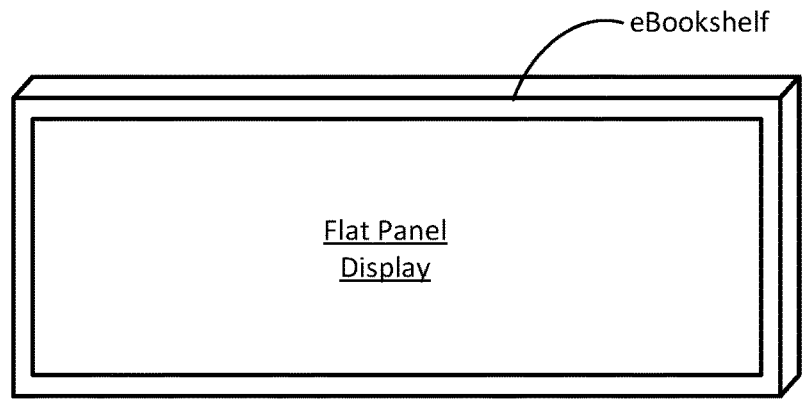
FIG. 1f illustrates a perspective view of an eBookshelf system configured in accordance with another embodiment of the present disclosure.

FIG. 1f illustrates a perspective view of an eBookshelf system configured in accordance with another embodiment of the present disclosure. As can be seen in this embodiment, the system is implemented with a flat panel display screen. The panel form factor is such that the panel could be hung on a wall, for instance. In one such embodiment, the display is implemented with a flat panel television (e.g., HDTV) that can be operatively coupled to a network. The TV may include typical componentry such as a processor and memory as well as a touchscreen interface, but may also be controlled, for example, by remote control or physical controls on the TV housing. In some embodiments, a spatial sensor can be used to detect user interactions with the TV, such as a sensor system similar to the Kinect system produced by Microsoft for the Xbox 360 video game console. In one such embodiment, the sensor system could be configured to sense/detect locations and gestures of the user's finger/hand/voice, etc. The sensors may be positioned, for example, at the periphery of the display or at some other suitable position wherein user interactions with the display can be observed by the sensors and reported accordingly. To this end, any suitable computer vision system can be used. In one such embodiment, the user interface presented by the flat panel display may look like or otherwise be modeled after the various interfaces depicted in FIG. 3a-b, 4a-b, 5a-b, and 6a-b. Such a flat panel TV or display is generally referred to herein as an eBookshelf, in accordance with an embodiment.

Figure 2A:
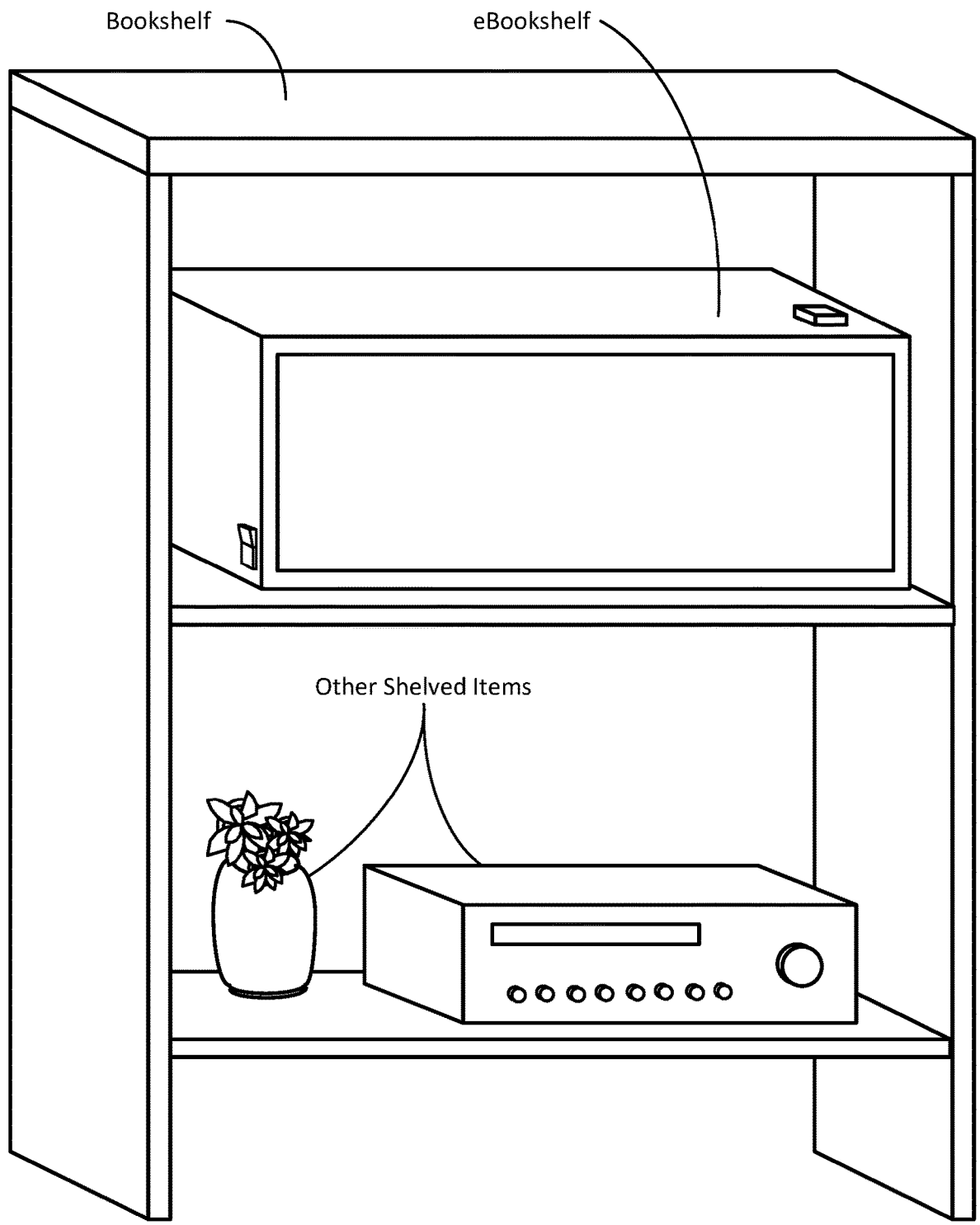
FIG. 2a illustrates a perspective view of an electronic bookshelf system deployed on an actual bookshelf, in accordance with an embodiment of the present disclosure.

FIG. 2a illustrates a perspective view of an eBookshelf system deployed on an actual bookshelf, in accordance with an embodiment of the present disclosure. This example embodiment has a power switch on the side and a home button on the top right, and is about 12 inches deep and 24 inches long and about 12 inches tall. Again, numerous form factors can be used, and the claimed subject matter is not intended to be limited to a particular size range or configuration. In still other embodiments, note that multiple eBookshelf systems can be vertically stacked (and horizontally) without a physical bookcase to create a wall of books in a bookcase format. The length of the eBookshelf can be extended as desired.

Figure 2B:
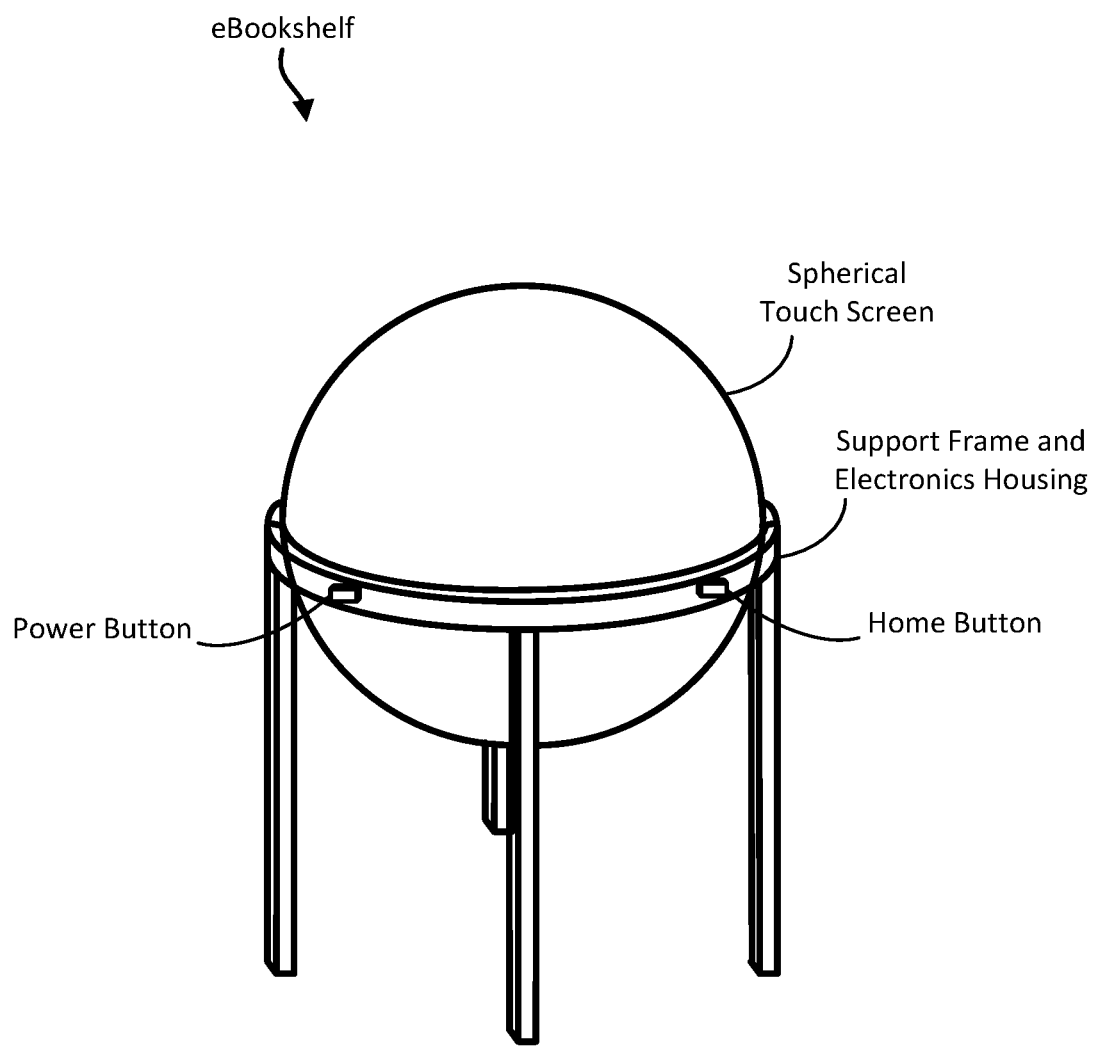
FIG. 2b illustrates a perspective view of an electronic bookshelf system implemented with a spherical touch screen display, in accordance with an embodiment of the present disclosure.

FIG. 2b illustrates a perspective view of an electronic bookshelf system implemented with a spherical touch screen display, in accordance with an embodiment of the present invention. As will be appreciated in light of this disclosure, the spherical display effectively provides a user interface to the underlying computing system and can be implemented, for example, as previously described by Hrvoje Benko, Andrew D. Wilson, and Ravin Balakrishnan of Microsoft Research, "*Sphere: Multi-Touch Interactions on a Spherical Display*", UIST'08, Oct. 19-22, 2008, Monterey, Calif., USA. While such as spherical display is suggested for use in encouraging collaboration of multiple users, it could also be used as an alternative mechanism to present the various user interfaces described herein, so that a single user could peruse content in the eBookshelf system environment. Any other suitable spherical or curved touch screen display technology can be used as well, such as displays that can be sometimes used in informational kiosks or ATMs. This example embodiment has a power switch and a home button implemented on the supporting frame work which can also be used to house the underlying computing system to which the spherical display is used to interact. In one such embodiment, the user interface presented by the spherical display may look like or otherwise be modeled after the various interfaces depicted in FIG. 3a-b, 4a-b, 5a-b, and 6a-b, which will now be discussed in turn. Such a spherical display is generally referred to herein as a booksphere.

User Interface

FIGS. 3a-b, 4a-b, 5a-b, 6a-b, and 7a-b illustrate various example screen shots of a user interface that can be used with an eBookshelf system configured in accordance with an embodiment of the present disclosure. As will be appreciated in light of this disclosure, the user interface can be presented on any suitable display screen (flat, curved, etc) and may further be implemented in conjunction with touch screen technology. However, other input mechanisms can be used (e.g., mouse, trackpad, voice commands, remote control, etc) as well, in accordance with other embodiments.

Figure 3A:
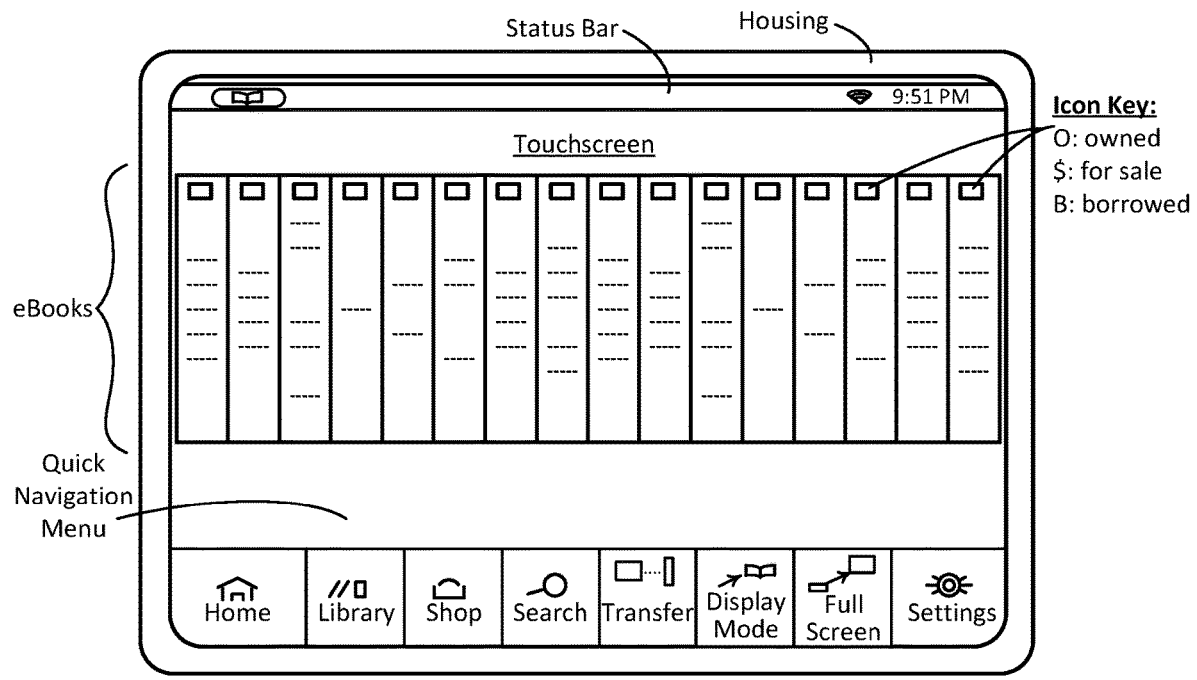
FIGS. 3a-b, 4a-b, 5a-b, 6a-b, and 7a-b illustrate various example screen shots of a user interface that can be used with an electronic bookshelf system configured in accordance with an embodiment of the present disclosure.

As can be seen in FIG. 3a, a touchscreen based user interface is provided, which in this example embodiment includes a quick navigation menu having a number of main categories to choose from (Home, Library, Shop, Search, Transfer, Display Mode, Full Screen, and Settings) and a status bar that includes a number of icons (e.g., a wireless network icon and a book icon) and a clock. Other embodiments may have fewer or additional touchscreen features. Such user interface touchscreen controls can be programmed or otherwise configured using any number of conventional or custom technologies as will be appreciated in light of this disclosure. In general, the touchscreen translates the user touch in a given location into an electrical signal which is then received and processed by the underlying circuitry (processor, etc). Additional example details of the underlying circuitry will be discussed in turn with reference to FIG. 8. In one embodiment, a typical computing device architecture is used to execute the user interface as described herein.

Figure 3B:
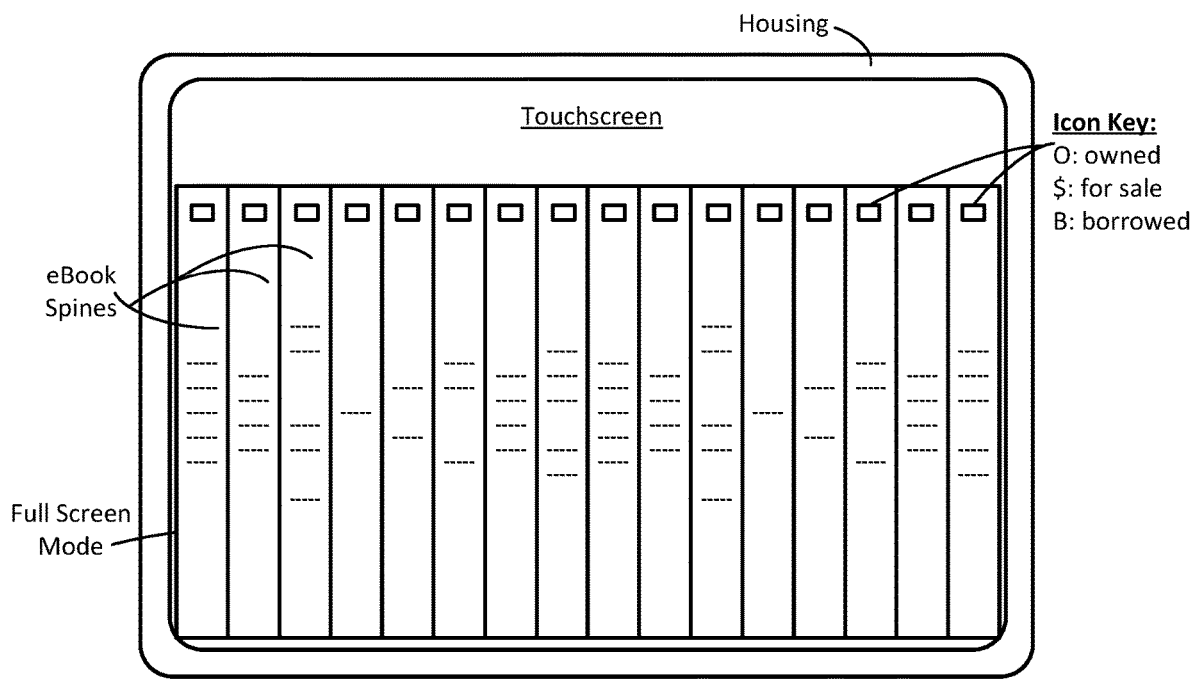

Also shown in FIG. 3a is a graphical image of virtual book binders available for perusal and/or reading. The display may be in color, thereby allowing for the actual book cover art to be displayed in real-life fashion. The user may place the system in full screen mode by touching the Full Screen item of the quick navigation menu, so as to give a more realistic bookcase feel, as shown in FIG. 3b. The full screen mode may also automatically engage, for instance, after a period of non-use, in accordance with some embodiments. In some such cases, the displayed content can be automatically rotated or otherwise changed so as to effectively provide a screen saver while also providing a display of eBooks.

With further reference to the example embodiment shown in FIGS. 3a-b, the user interface is programmed or otherwise configured to provide icons or other suitable marking on the binder of each content item (or at least some of the content items). The icon indicates whether that content item is owned by the user (e.g., an icon of 'O' for owned), not owned by the user but available for purchase from a given content provider (e.g., an icon of '$' for sale), or currently on loan or otherwise borrowed by the user (e.g., an icon of 'B' for borrowed). Numerous variations can be made. For instance, in some cases only content items owned by the user are so marked or otherwise distinguished. In other example embodiments, content items that are available for purchase may include a price within the icon. In some cases, content items that are on the user's wishlist are designated with another marking (e.g., an icon of 'WL' for wishlist) and content items that are on the user's favorites list are designated with another marking (e.g., an icon of 'F' for favorite). Other such status indicator schemes may be used as will be appreciated in light of this disclosure. In still other embodiments, no such icons/markings are used on the displayed binders.

Figure 4A:
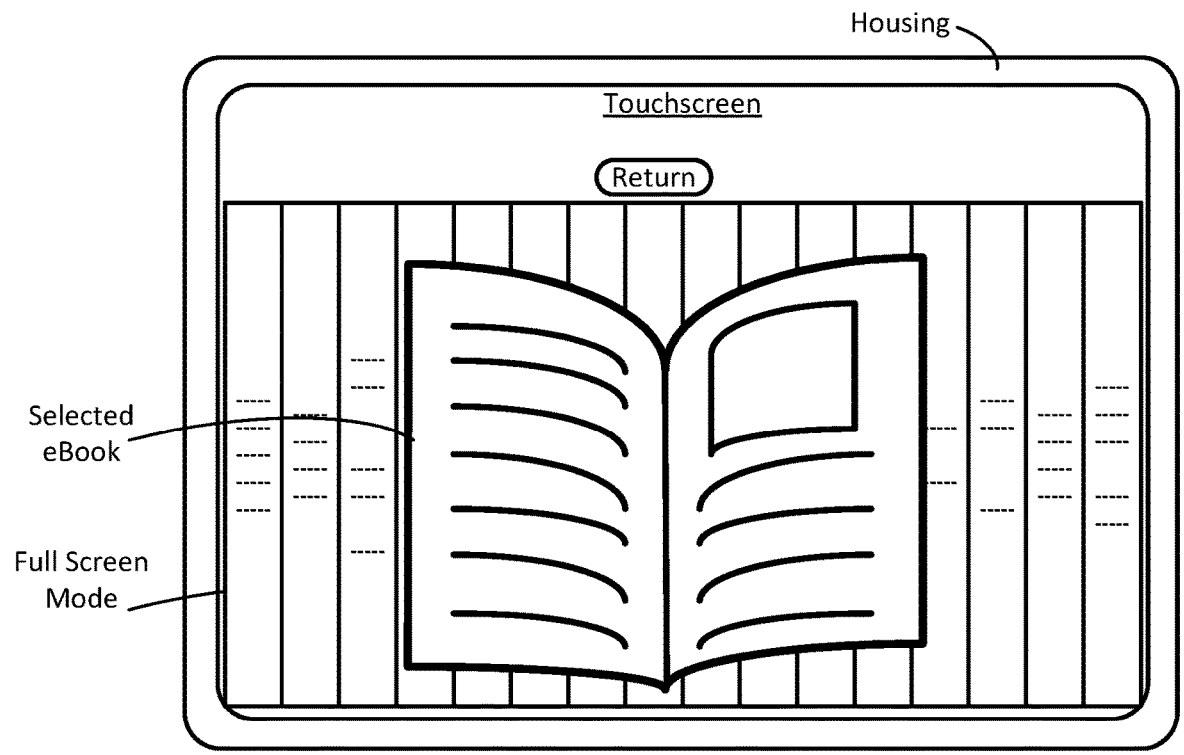
Figure 4B:
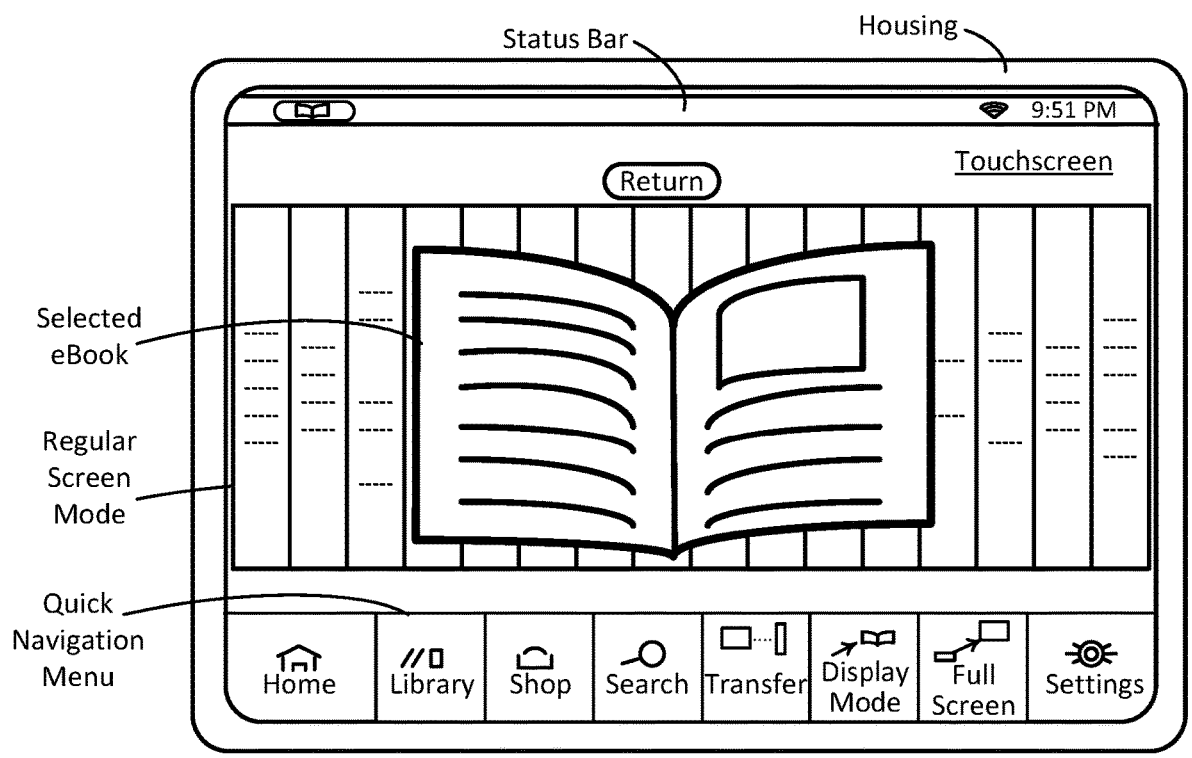

In some embodiments, if the user touches a binder of one of the displayed eBooks, that particular eBook is then virtually pulled from the shelf and splayed open across the face of the touchscreen display. In some embodiments, a suitable animation that mimics the pulling of an actual book out of a bookcase can be used, wherein the user can touch the top portion of the spine/binder and effectively drag the book out of its current slot and lay it on its side in a single continuous drag gesture so that the cover and pages of the book may then be virtually turned. This can be done in full screen mode, as shown in FIG. 4a, or in regular screen mode, as shown in FIG. 4b. Note that regular screen mode can be re-entered, for example, by pressing home button on the top of the unit, or by selecting a corresponding touchscreen control, or by selecting a dedicated hardware control (on the housing) or a remote control. When regular screen mode is entered, user interface features such as the quick navigation menu and the status bar can be returned to the screen for user interaction.

Another option is to shift the display of the eBooks from viewing the spines, to viewing the front covers, side by side. In either case, the user can effectively scroll or otherwise access items on the shelf. The displayed portion of the virtually shelved collection can be scrolled or otherwise changed, for example, using swipe gestures, voice commands (e.g., such as "show me titles beginning with D" or "show me books by Steinbeck"), or by interacting with a user interface control feature(s) that effectively sets the display criteria (e.g., use a pull-down menu to direct that the collection be sorted by titles and then select "D").

Thus, regardless of how the eBooks are displayed, in some embodiments, finger swipes or some other suitable user control feature can be used to display a next set of binder or front covers, etc. The next set may be, for instance, selected alphabetically (based on title, or author, or other desired criteria that can be implemented alphabetically) or at random and/or based on user preferences (e.g., provided by the user and/or derived from observing user behavior), and may be drawn from the user's personal collection and/or from one or more commercial retailers. While hand gestures and other tactile controls can be used, some embodiments may be implemented with voice control capability so that verbal commands can be used, while other embodiments may employ mouse-based control or trackpad-based control or some other suitable user interface technology.

Figure 5A:
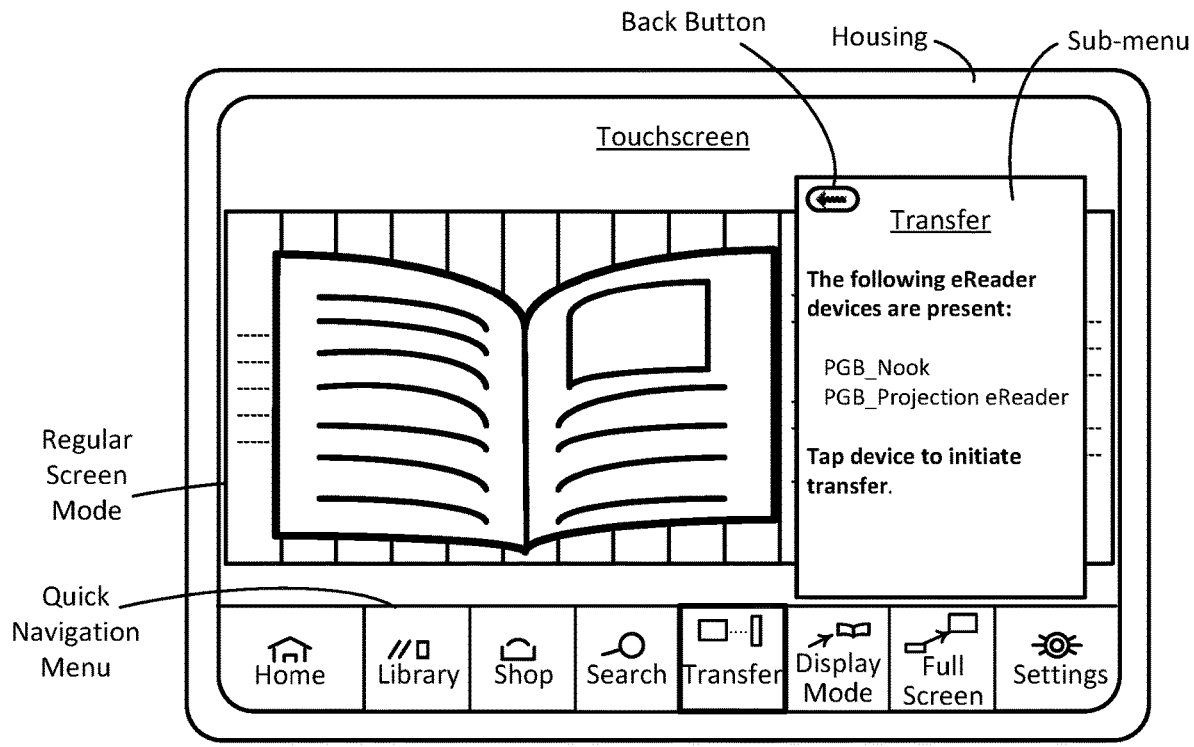
Figure 5B:
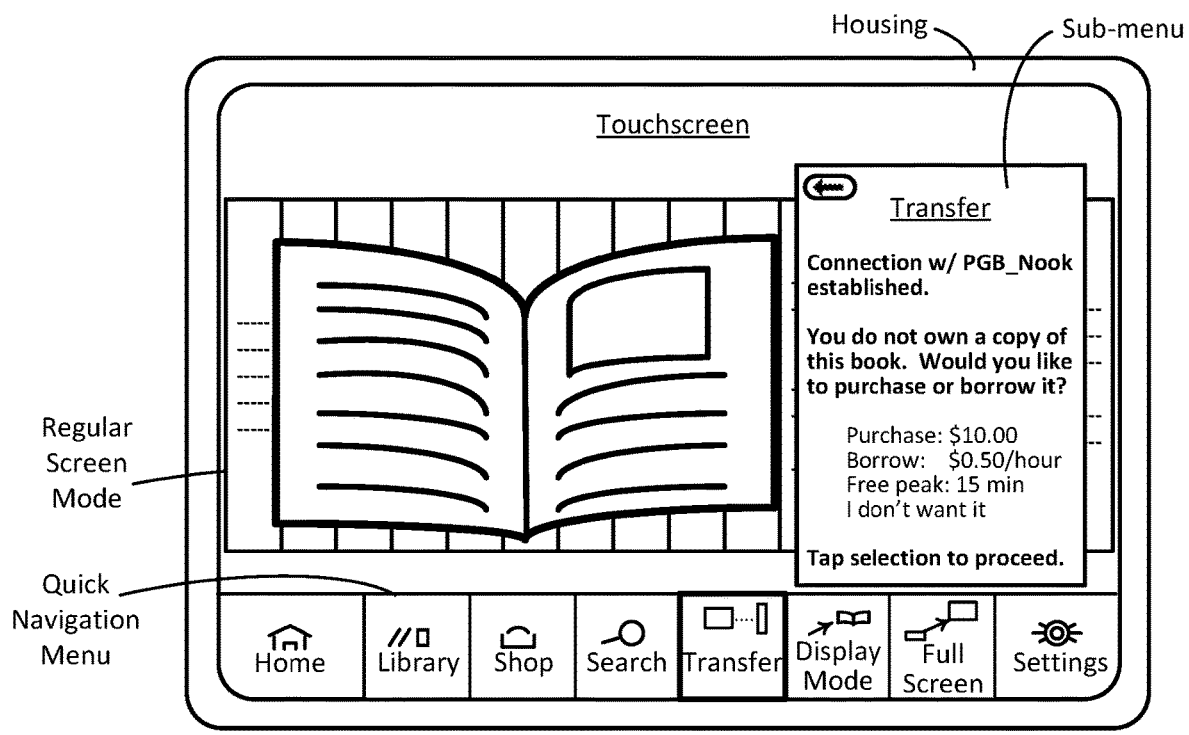

When a selected eBook is open, the user can virtually turn pages to read or otherwise sample the eBook. Selecting the Return touchscreen control will return the eBook to its shelved position (with a corresponding animation such as the reverse of the animation used when the book is selected, in some embodiments), allowing the user to continue browsing. If the user wishes to transfer the eBook to a reading device, then the user can select the Transfer control in the quick navigation menu, which causes a corresponding sub-menu to be displayed to the user, as shown in FIG. 5a. In this example embodiment, the eBookshelf system is configured to identify whether or not it is currently connected to any personal devices, and if not, to determine if any devices are available for connection. If so, the user may be prompted to pick the desired device as shown.

Any suitable discovery protocol and wireless communication standards can be used in the transferring of content, such as WiFi according to the IEEE 802.11 standard. The personal reading device may be, for example, an e-reader such as the NOOK® by Barnes & Noble. Other example devices may include mobile phones or computing devices (laptops, desktops, etc). In some embodiments, the eBookshelf system can be used in conjunction with a front projection eReader system (such as that described in co-pending application Ser. No. 13/961,356 filed on Aug. 7, 2013 and titled "Front Projection eReader System", which is herein incorporated by reference in its entirety. In such a case, the eBookshelf system could be used as a content server for the Front Projection eReader System.

After a connection to a given device is established, a determination is made as to whether the user owns or otherwise has rights to the selected content, in some embodiments. If not, the user is given an opportunity to purchase that content, as shown in the example embodiment of FIG. 5b. In this case, the user may choose to purchase the content outright, to borrow the content at an hourly rate, to peruse the content for free for a limited time period, or to simply loose interest and back out of the transaction (by selecting, for instance, 'I don't want it'). Digital rights management rules and techniques can be applied as necessary to ensure that protected content is properly and legally distributed.

Numerous user interface features can be implemented here, as will be appreciated in light of this disclosure. For instance, note the back arrow button in the upper left corner of each of the sub-menus in FIGS. 5a-b, which when touched or otherwise selected by the user will close that sub-menu and return to the previous screen. Further note that not all illustrated features need to be provided. For instance, there is no status bar shown in FIGS. 5a-b.

Figure 6A:
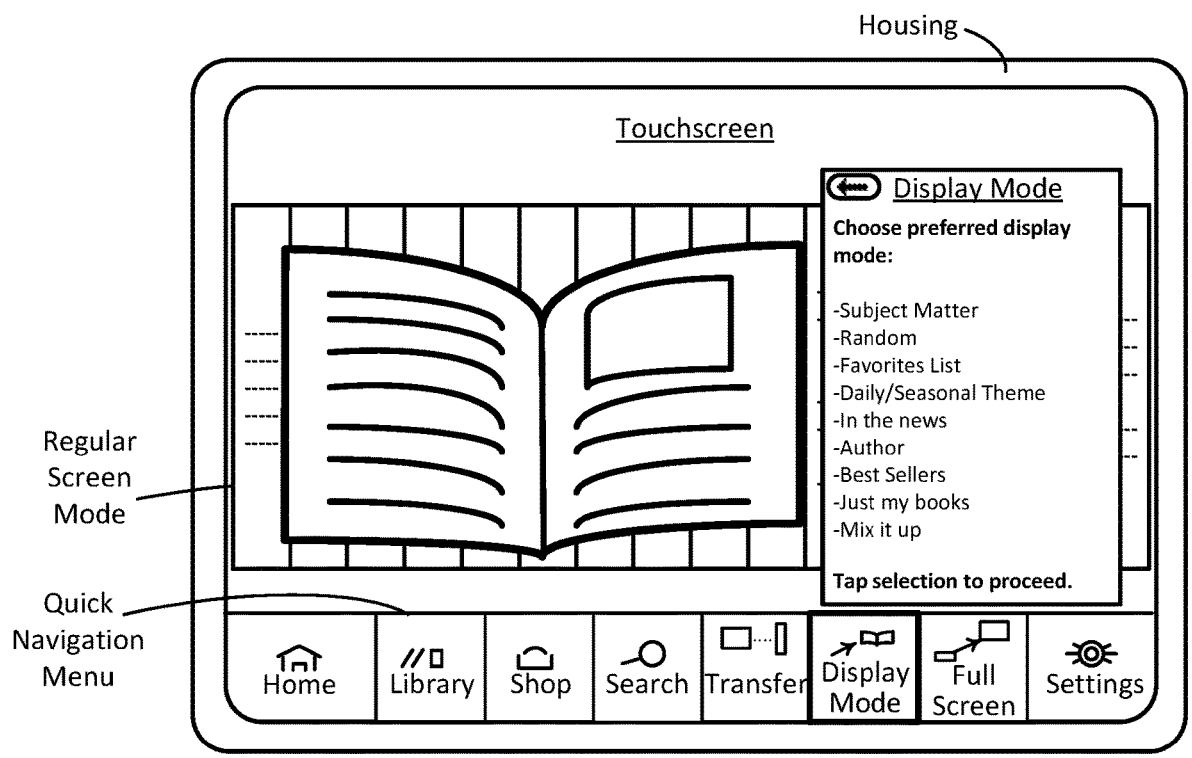

The user also may be given the ability to configure the type of display experience that he or she prefers. For example, the user can select the Display Mode control in the quick navigation menu, which causes a corresponding sub-menu to be displayed to the user, as shown in FIG. 6a. As can be seen, in this example embodiment, the eBookshelf system provides the user with a number of display modes, including: subject matter based on keywords provided by user (Subject Matter); random-based selections made by the eBookshelf system (Random); selections based on a favorites list provided by the user or otherwise inferred by the eBookshelf system based on historical user data (Favorites List); selections based on a daily or seasonal theme (e.g., holiday books, Flag Day books, Talk Like a Pirate Day books, etc) (Daily/Seasonal Theme); selections based on current popular news items (In the news); selections based on an author specified by the user or recommended to the user by the eBookshelf system based on known authors the user has previously read (Author); selections from popular best seller lists (Best Sellers); selections from the user's private collection (Just my books); and selections from multiple categories specified by the user or otherwise selected for the user by the eBookshelf system (Mix it up).

Figure 6B:
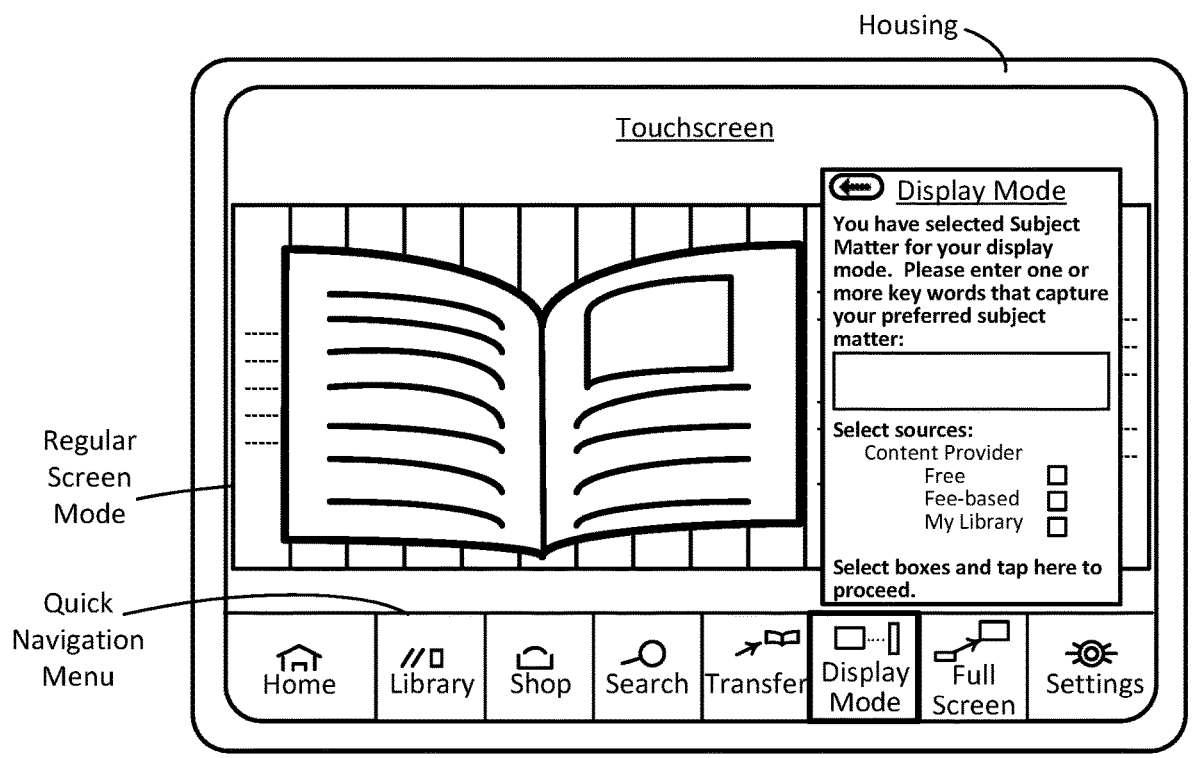

If the display mode selection by the user requires user input, then the user may be further prompted to provide the necessary input, as shown in the example of FIG. 6b. In that example, the user is being asked to provide some keywords to help the eBookshelf system identify eBooks having the desired subject matter. The user may further be asked other questions, such as fiction/non-fiction; Authors from USA or other country; etc. As can be further seen in the example embodiment of FIG. 6b, the user may be asked to specify from what sources is the content to be pulled. Example choices include, for instance, free content, fee-based content, content from the user's personal library, or possibly content from a family member sharing the same eBookshelf system or a friend's library (e.g., social network based sharing, compliant with applicable digital rights management rules).

Figure 7A:
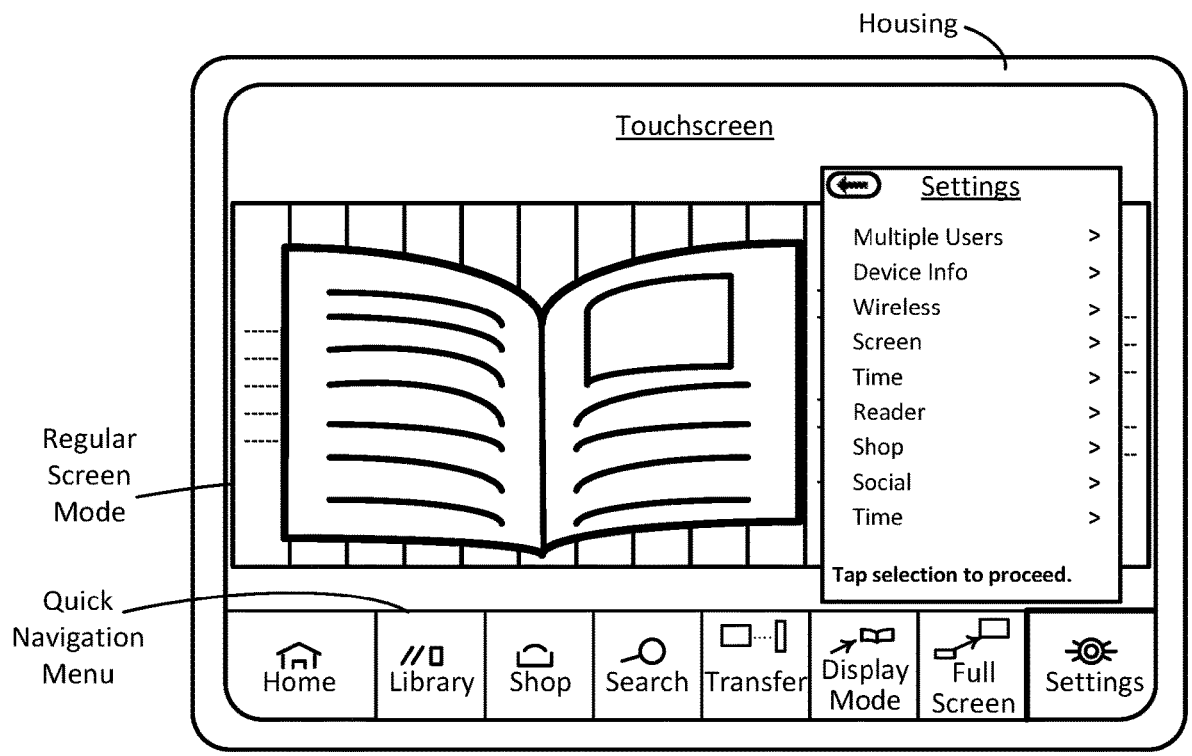
Figure 7B:
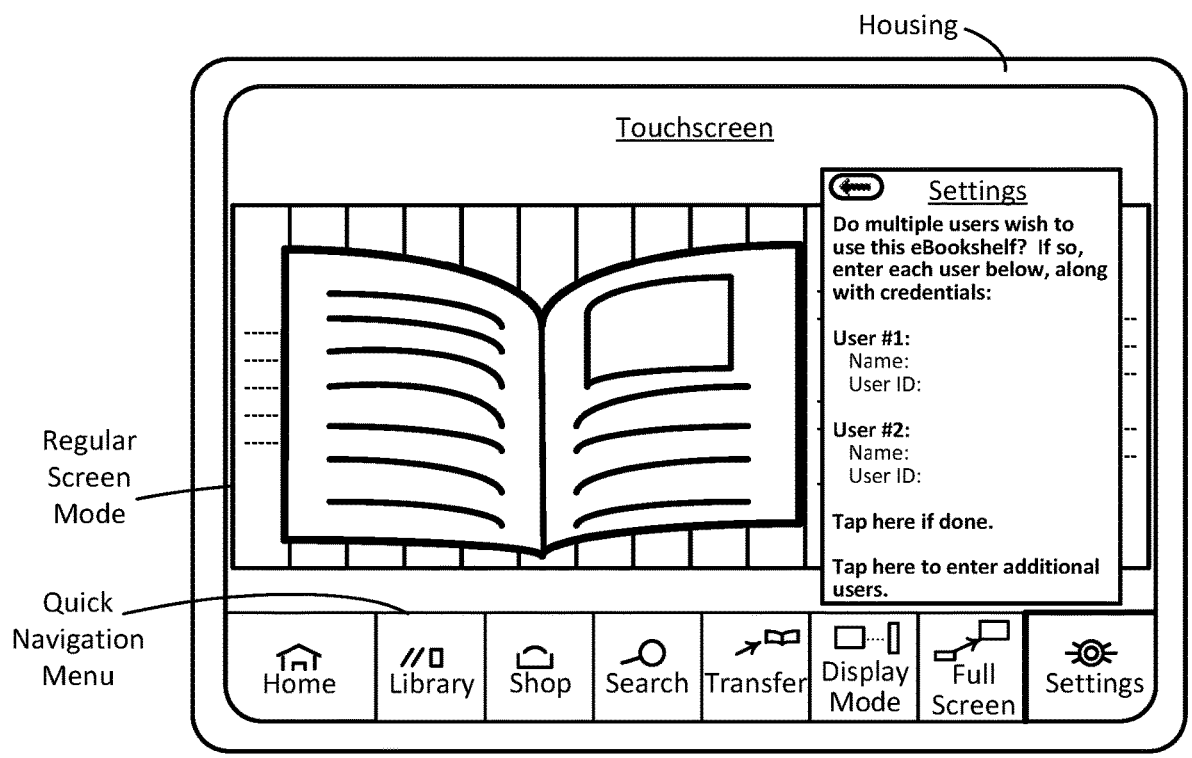

The user may also be provided an opportunity to configure various parameters of the system and user experience. For example, the user can select the Settings control in the quick navigation menu, which causes a corresponding sub-menu to be displayed to the user, as shown in FIG. 7a. In this example embodiment, the eBookshelf system includes a number of settings, including one for multiple users. If a given eBookshelf system is to be shared by multiple users, then each user's content may be kept separate from other users. One way to implement such a separation is to employ user logon credentials such as a user ID and a password if so desired. Thus, at the onset of using the eBookshelf system, the user could enter his/her credentials, and the user experience going forward could be customized/personalized to that user. So, multiple users could each have their own favorites list, preferred display mode, etc. Thus, if the user selects the multiple users item in the Settings sub-menu, a further sub-menu can be displayed to the user such as the one shown in FIG. 7b, which allows the user to enter one or more users for custom access to the eBookshelf system.

System Architecture

Figure 8:
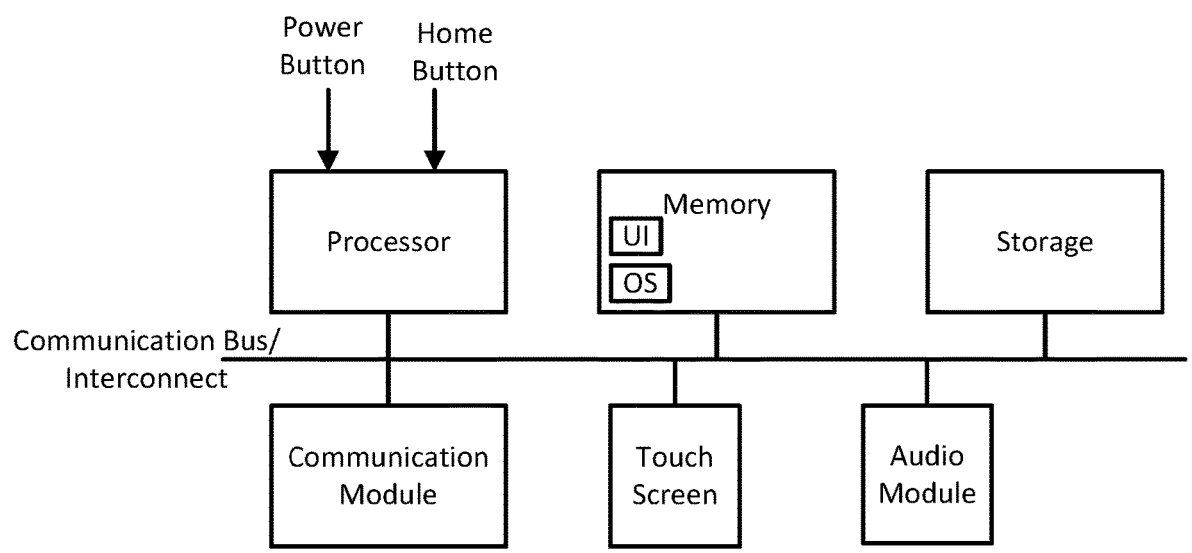
FIG. 8 illustrates a block diagram of an electronic bookshelf system configured in accordance with an embodiment of the present invention.

FIG. 8 illustrates a block diagram of an eBookshelf system configured in accordance with an embodiment of the present disclosure. As can be seen, this example device includes a processor, memory (e.g., RAM and/or ROM for processor workspace and storage), additional storage/memory (e.g., for content), a communications module, a touchscreen, and an audio module. A communications bus and interconnect is also provided to allow inter-device communication. Other typical componentry and functionality not reflected in the block diagram will be apparent (e.g., graphics card, co-processor, etc).

In this example embodiment, the memory includes a number of modules stored therein that can be accessed and executed by the processor (and/or a co-processor). The modules include an operating system (OS) and a user interface (UI). The modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device including various functionalities as described herein. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor or chip set, and may include one or more co-processors or controllers to assist in system control. In this example case, the processor receives input from the user, including input from or otherwise derived from the power button and the home button. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory). The display can be implemented, for example, with a Planar® EP-Series LCD touchscreen display, or any other suitable display and touchscreen interface technology (e.g., such as a spherical touch screen or a flat panel TV, as previously discussed). The communications module can be, for instance, any suitable 802.11 b/g/n WLAN chip or chip set, which allows for connection to a local network so that content can be downloaded to the system from a remote location (e.g., content provider, etc). The communications module may also be used to receive commands from a remote control associated with the eBookshelf system, in some embodiments.

The operating system (OS) module can be implemented with any suitable OS, but in some example embodiments is implemented with Google Android OS or Linux OS. The user interface (UI) module can be, for example, based on the various screen shots and user case scenarios shown in FIGS. 3a-7b and touchscreen technology. The audio module can be configured, for example, to speak or otherwise aurally present a selected eBook, if preferred by the user. Numerous commercially available text-to-speech modules can be used, such as Verbose text-to-speech software by NCH Software.

Thus, an embodiment of the eBookshelf system can be used by accessing a touchscreen-based user interface or using an optional remote. The various menu driven options allow for the retrieval and display of a user's library of eBooks (from local hard drive or other storage facility), as well as the possibility of displaying any other commercially available content by accessing one or more cloud-based services or content provider websites. The eBookshelf system can be designed to facilitate the browsing of new books much in the way a person would do so at a brick-and-mortar bookstore, allowing the person to virtually remove the book from the shelf and leaf through it. There is a wide choice in how a user may display books, from the edges and/or by the cover, much in the way done in store. One example implementation is to constantly or otherwise periodically renew the books on display as new books are released (e.g., such as an automatic in-house presentation of best sellers that automatically updates as a subscribed best seller list changes), or to display a user's favorites and those the user would like to purchase. There is also capability to interact with an eReader device or system, so as to transfer a book or other content from the eBookshelf to the user's chosen consuming device with a touch, using either wireless and/or wired protocol. Multiple eBookshelf systems can be attached to one another to extend the length and/or height of the virtual bookshelf.

Numerous variations and embodiments will be apparent in light of this disclosure. For instance, one example embodiment provides an electronic bookshelf system. The system includes: a housing for housing electronics of the system; a touchscreen display operatively coupled to the electronics; and a user interface configured to present a plurality of digital content items via the display such that the digital content items look like items stored on a bookshelf, and to allow a user to select and sample a presented content item and to transfer that content item to an eReader device. In some cases, the system has the form factor of a bookshelf such that the housing and touchscreen display each has an elongated rectangular shape that is wider in the horizontal direction than it is tall in the vertical direction. In some such cases, the system can be combined with additional such systems to extend the bookshelf in the vertical and/or horizontal directions. In some cases, the system has the form factor of a booksphere such that the display is curved. In some cases, the plurality of digital content items includes a mix of user-owned digital content and content for sale that can be sampled by a user of the system with an option to purchase. In one such case, the mix of digital content includes borrowed content. In another such case, the mix of digital content is user-configurable. In some cases, the system automatically changes the displayed digital content so as to provide a screen saver effect. In some cases, the user interface is further configured to present a menu that allows at least one of content searching, content buying, and system configuration. In some cases, the digital content items look like items stored on a bookshelf in that at least some spines of the presented digital content items are shown side by side with no space between the items. In one such case, the user interface is further configured to show a content item being virtually pulled from the bookshelf and laid on its side in response to a user selecting that item via a touch-based gesture on the spine of that content item. In one such case, the user interface is further configured to allow the selected content to be perused via swipe gestures that trigger virtual page turning of that selected content. In some cases, the user interface includes a full screen mode that allows only digital content to be displayed at least a portion of the time while the full screen mode is engaged, and a regular screen mode that shows both digital content and a quick navigation menu. In some example cases, the system includes an audio module to aurally present a selected one of the digital content items. In some example cases, the system is capable of displaying content from commercial retailers to the user via a network connection. In some cases, the user interface allows for multiple users of the system, each user having credentials to allow a personalized user experience.

Another embodiment provides an electronic bookshelf system. The system of this example case includes a housing for housing electronics of the system, the electronics including a processor, memory, and a communication module that allows access to digital content from commercial retailers via a network connection; a touchscreen display; and a user interface configured to present a plurality of digital content items via the display such that the digital content items look like items stored on a bookshelf, and to allow a user to select, sample, and purchase a presented content item and to transfer that content item to an eReader device. The user interface is further configured to allow at least one of content searching and system configuration, and the system has the form factor of: a booksphere such that the display is curved and/or a bookshelf such that the housing and touchscreen display each has an elongated rectangular shape that is wider in the horizontal direction than it is tall in the vertical direction. In some example cases, the plurality of digital content items includes a mix of user-owned digital content, borrowed content, and content for sale and the content for sale can be sampled by a user of the system with an option to purchase.

Another embodiment provides an electronic bookshelf system. The system of this example case includes a housing for housing electronics of the system, the electronics including a communication module that allows access to digital content via a network connection; a display; and a user interface configured to present a plurality of digital content items via the display such that the digital content items look like items stored on a bookshelf and at least some spines of the presented digital content items are shown side by side with no space between the items, and to allow a user to select a presented content item and transfer that content item to an eReader device. The user interface includes a full screen mode that allows only digital content to be displayed at least a portion of the time while the full screen mode is engaged, and a regular screen mode that shows both digital content and one or more user controls. In some cases, the user interface is further configured to at least one of: show a content item being virtually pulled from the bookshelf in response to a user selecting that item via a touch-based gesture on the spine of that content item; allow the selected content to be perused via swipe gestures that trigger virtual page turning of that selected content; and allow for multiple users of the system, each user having credentials to allow a personalized user experience. In some cases, the plurality of digital content items includes a mix of user-owned digital content and at least one of borrowed content and content for sale, and the content for sale can be sampled by a user of the system with an option to purchase.

The foregoing description of the embodiments of the disclosure has been presented for the purposes of illustration and description. It is not intended to be exhaustive or to limit the subject matter to the precise form disclosed. Many modifications and variations are possible in light of this disclosure. For example, although eBooks are focused on in this disclosure, other digital content can equally benefit from an embodiment of the claimed subject matter, such as digital movies, magazines, newspapers, artwork, etc. It is intended that the scope of the disclosure be limited not by this detailed description, but rather by the claims appended hereto.

The invention claimed is:

1. An electronic bookshelf system, comprising:
a housing including electronics of the system, the electronics including a processor;
a touchscreen display operatively coupled to the electronics and having an elongated rectangular shape, such that the touchscreen display is at least two times wider in the horizontal direction than it is tall in the vertical direction; and
a user interface at least one of executable and controllable by the processor and configured to
cause display of, on the touchscreen display, a virtual bookshelf that includes at least a portion of a plurality of available digital content items, wherein at least some digital content items included in the displayed virtual bookshelf are digital books with their respective virtual binders facing outward, and
in response to a user selection input on a binder of one of the displayed digital books, the user selection input including a continuous drag gesture to pull the book out from the virtual bookshelf and lay the book on a side of the book, cause display of an animation that mimics the selected digital book being pulled from the virtual bookshelf and laid on its side to be made available for browsing, wherein the selected digital book is displayed in a centrally overlaid fashion across unselected digital content items such that (i) at least sections of virtual binders of first one or more unselected digital content items are displayed on a left side of the selected digital book, (ii) at least sections of virtual binders of second one or more unselected digital content items are displayed on a right side of the selected digital book, and (iii) at least sections of virtual binders of third one or more unselected digital content items are displayed on a top side and/or a bottom side of the selected digital book, and
in response to a page turning input, cause virtual page turning of the selected digital book, and
in response to a scroll input or a change in display criteria, update the displayed virtual bookshelf to include at least one previously undisplayed digital content item included in the available digital content items, wherein for at least some display criteria the displayed virtual bookshelf includes both user-owned digital content items and digital content items for sale or loan.

2. The electronic bookshelf system of claim 1, wherein the touchscreen display is 24 to 36 inches long in the horizontal direction and 10 to 14 inches tall in the vertical direction.

3. The electronic bookshelf system of claim 1, wherein the system can be electronically coupled with one or more additional electronic bookshelf systems to extend the displayed virtual bookshelf in the horizontal direction, or the vertical direction, or both the horizontal and vertical directions.

4. The electronic bookshelf system of claim 1, wherein the system further includes at least one interconnect so that the system can be operatively coupled with additional such systems to display additional content items.

5. The electronic bookshelf system of claim 4, wherein the at least one interconnect achieves operative coupling with an additional system via a wireless communication link.

6. The electronic bookshelf system of claim 1, wherein at least some digital content items included in the displayed virtual bookshelf are digital magazines.

7. The electronic bookshelf system of claim 1, wherein the user interface is further configured to cause display of a menu with a plurality of selectable display modes, and in response to a selection of one of the selectable display modes, adjust the displayed virtual bookshelf in accordance with the selected display mode.

8. The electronic bookshelf system of claim 7, wherein at least one selectable display mode defines a unique display criteria, and wherein the unique display criteria is based on at least one of a subject matter, a theme, an author, and a list.

9. The electronic bookshelf system of claim 1, wherein the user interface is further configured to:
  determine that first one or more digital content items are user-owned, and second one or more digital content items are for sale or loan and are not user-owned; and
  provide (i) a first marking on respective virtual binders of the first one or more digital content items to indicate that the first one or more digital content items are user-owned, and (ii) a second marking on respective virtual binders of the second one or more digital content items to indicate that the second one or more digital content items are for sale or loan and not user-owned.

10. The electronic bookshelf system of claim 9, wherein the user interface is configured to cause simultaneous display of the first one or more digital content items and the second one or more digital content items in the virtual bookshelf with their respective virtual binders facing outward.

11. A method of displaying a virtual bookshelf, the method comprising:
  causing display of, on a touchscreen display having an elongated rectangular shape, the virtual bookshelf that includes at least a portion of a plurality of available digital content items, wherein at least some digital content items included in the displayed virtual bookshelf are digital books with their respective virtual binders facing outward;
  in response to receiving a user selection input on a binder of one of the displayed digital books, the user selection input including a continuous drag gesture to pull the book out from the virtual bookshelf and lay the book on a side of the book, causing display of an animation that mimics the selected digital book being pulled from the virtual bookshelf and laid on its side to be made available for browsing, wherein the selected digital book is displayed in a centrally overlaid fashion across unselected digital content items such that (i) at least sections of virtual binders of first one or more unselected digital content items are displayed on a left side of the selected digital book, (ii) at least sections of virtual binders of second one or more unselected digital content items are displayed on a right side of the selected digital book, and (iii) at least sections of virtual binders of third one or more unselected digital content items are displayed on a top side and/or a bottom side of the selected digital book;
  in response to receiving a page turning input, causing virtual page turning of the selected digital book; and
  in response to receiving a scroll input or a change in display criteria, updating the displayed virtual bookshelf to include at least one previously undisplayed digital content item included in the available digital content items, wherein for at least some display criteria the displayed virtual bookshelf includes both user-owned digital content items and digital content items for sale or loan.

12. The method of claim 11, further comprising causing display of a menu with a plurality of selectable display modes, and in response to a selection of one of the selectable display modes, adjusting the virtual bookshelf according to the selected display mode.

13. The method of claim 12, wherein at least one selectable display mode defines a unique display criteria, and wherein the unique display criteria is based on at least one of a subject matter, a theme, an author, and a list.

14. The method of claim 11, further comprising:
  determining that first one or more digital content items are user-owned, and second one or more digital content items are for sale or loan and are not user-owned; and
  providing (i) a first marking on respective virtual binders of the first one or more digital content items to indicate that the first one or more digital content items are user-owned, and (ii) a second marking on respective virtual binders of the second one or more digital content items to indicate that the second one or more digital content items are for sale or loan and not user-owned.

15. The method of claim 14, wherein causing display of the virtual bookshelf comprises causing simultaneous display of the first one or more digital content items and the second one or more digital content items in the virtual bookshelf with their respective virtual binders facing outward.

16. A computer program product including one or more non-transitory machine-readable mediums having instructions encoded thereon that when executed by at least one processor causes a process to be carried out for displaying a virtual bookshelf, the process comprising:
  causing display of, on a touchscreen display having an elongated rectangular shape, the virtual bookshelf that includes at least a portion of a plurality of available digital content items, wherein at least some digital content items included in the displayed virtual bookshelf are digital books with their respective virtual binders facing outward;
  in response to receiving a user selection input on a binder of one of the displayed digital books, the user selection input including a continuous drag gesture to pull the book out from the virtual bookshelf and lay the book on a side of the book, causing display of an animation that mimics the selected digital book being pulled from the virtual bookshelf and laid on its side to be made available for viewing, wherein the selected digital book is displayed in a centrally overlaid fashion across unselected digital content items such that (i) at least sections of virtual binders of first one or more unselected digital content items are displayed on a left side of the selected digital book, (ii) at least sections of virtual binders of second one or more unselected digital content items are displayed on a right side of the selected digital book, and (iii) at least sections of virtual binders of third one or more unselected digital content items are displayed on a top side and/or a bottom side of the selected digital book;

in response to receiving a page turning input, causing virtual page turning of the selected digital book; and in response to receiving a scroll input or a change in display criteria, updating the displayed virtual bookshelf to include at least one previously undisplayed digital content item included in the available digital content items, wherein for at least some display criteria the displayed virtual bookshelf includes both user-owned digital content items and digital content items for sale or loan.

17. The computer program product of claim 16, wherein the process comprises causing display of a menu with a plurality of selectable display modes, and in response to a selection of one of the selectable display modes, adjusting at least a portion of a display area of the touchscreen display in accordance with the selected display mode.

18. The computer program product of claim 17, wherein at least one selectable display mode defines a unique display criteria, and wherein the unique display criteria is based on at least one of a subject matter, a theme, an author, and a list.

19. The computer program product of claim 16, wherein the process comprises:

determining that first one or more digital content items are user-owned, and second one or more digital content items are for sale or loan and are not user-owned; and providing (i) a first marking on respective virtual binders of the first one or more digital content items to indicate that the first one or more digital content items are user-owned, and (ii) a second marking on respective virtual binders of the second one or more digital content items to indicate that the second one or more digital content items are for sale or loan and not user-owned.

20. The computer program product of claim 19, wherein the process comprises causing simultaneous display of the first one or more digital content items and the second one or more digital content items in the virtual bookshelf with their respective virtual binders facing outward.

\* \* \* \* \*